US006965779B2

(12) United States Patent
Hill et al.

(10) Patent No.: US 6,965,779 B2
(45) Date of Patent: Nov. 15, 2005

(54) METHOD AND APPARATUS FOR PROVIDING DISPATCH CALLING THROUGH A WIRELESS COMMUNICATION SYSTEM INFRASTRUCTURE

(75) Inventors: Thomas Casey Hill, Crystal Lake, IL (US); Michael Kotzin, Buffalo Grove, IL (US); Henry Kazecki, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/171,919

(22) Filed: Jun. 14, 2002

(65) Prior Publication Data

US 2003/0232626 A1 Dec. 18, 2003

(51) Int. Cl.[7] .............................. H04B 7/00
(52) U.S. Cl. .................... 455/519; 455/412.2
(58) Field of Search ................ 455/520, 521, 455/445, 518, 519, 412.2

(56) References Cited

U.S. PATENT DOCUMENTS

| 5,719,918 | A | * | 2/1998 | Serbetcioglu et al. | ...... 380/271 |
|---|---|---|---|---|---|
| 5,835,860 | A | * | 11/1998 | Diachina | ...... 455/458 |
| 6,292,671 | B1 | * | 9/2001 | Mansour | ...... 455/518 |
| 6,385,461 | B1 | * | 5/2002 | Raith | ...... 455/518 |
| 6,484,037 | B1 | * | 11/2002 | Schmidt et al. | ...... 455/514 |
| 6,539,219 | B1 | * | 3/2003 | Gallant et al. | ...... 455/416 |
| 2003/0083086 | A1 | * | 5/2003 | Toyryla et al. | ...... 455/518 |

* cited by examiner

*Primary Examiner*—Nick Corsaro
(74) *Attorney, Agent, or Firm*—Charles W. Bethards

(57) ABSTRACT

A device (102) external to a wireless communication system infrastructure (104), defines (402) a dispatch group having a dispatch group identifier and including a plurality of wireless units (300). The device receives (404) a call for the dispatch group, the call including a message. The device establishes (408), through the wireless communication system infrastructure, a group connection to the plurality of wireless units in response to receiving the call; and delivers (410) the message and the dispatch group identifier to the plurality of wireless units through the group connection.

23 Claims, 3 Drawing Sheets

METHOD AND APPARATUS FOR PROVIDING DISPATCH CALLING THROUGH A WIRELESS COMMUNICATION SYSTEM INFRASTRUCTURE

FIELD OF THE INVENTION

This invention relates in general to wireless communication systems, and more specifically to a method and apparatus for providing dispatch calling through a wireless communication system infrastructure.

BACKGROUND OF THE INVENTION

Some wireless communication systems have the capability of handling dispatch calling, in which a single source can generate a message that is transmitted simultaneously to a plurality of recipients. Many existing wireless communication systems are not capable of providing dispatch calling, making such systems less desirable for applications that could benefit from dispatch calling. These dispatch-incapable systems are thus placed at a competitive disadvantage with respect to dispatch-capable systems.

DETAILED DESCRIPTION

What is needed is a method and apparatus for providing dispatch calling through a wireless communication system infrastructure. Preferably, the method and apparatus will add dispatch calling capability without requiring a significant change to the existing wireless communication system infrastructure.

The instant disclosure is provided to further explain in an enabling fashion the best modes of making and using various embodiments in accordance with the present invention. The disclosure is farther offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

Figure 1:
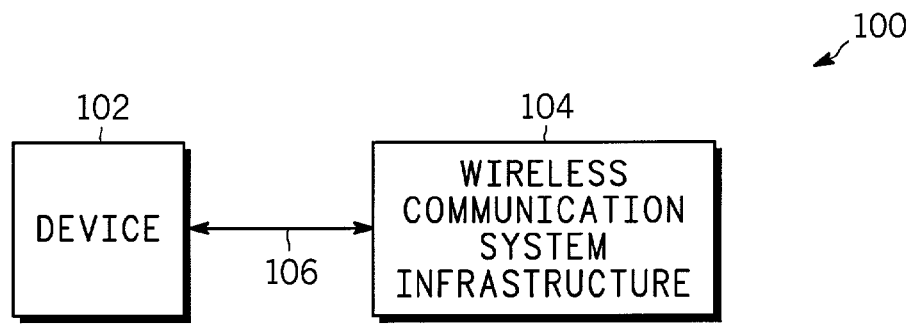
FIG. 1 is an electrical block diagram of an exemplary dispatch system in accordance with the present invention.

Referring to FIG. 1, an electrical block diagram of an exemplary dispatch system 100 in accordance with the present invention comprises a device 102 coupled through a communication link 106 to a conventional wireless communication system infrastructure 104. The device 102 is preferably one of a server 200 (FIG. 2) arranged and programmed in accordance with the present invention, and a wireless mobile unit 300 (FIG. 3) arranged and programmed in accordance with the present invention. Two embodiments of the device comprising, respectively, the server 200 and the wireless mobile unit 300 will be described further herein below.

Figure 2:
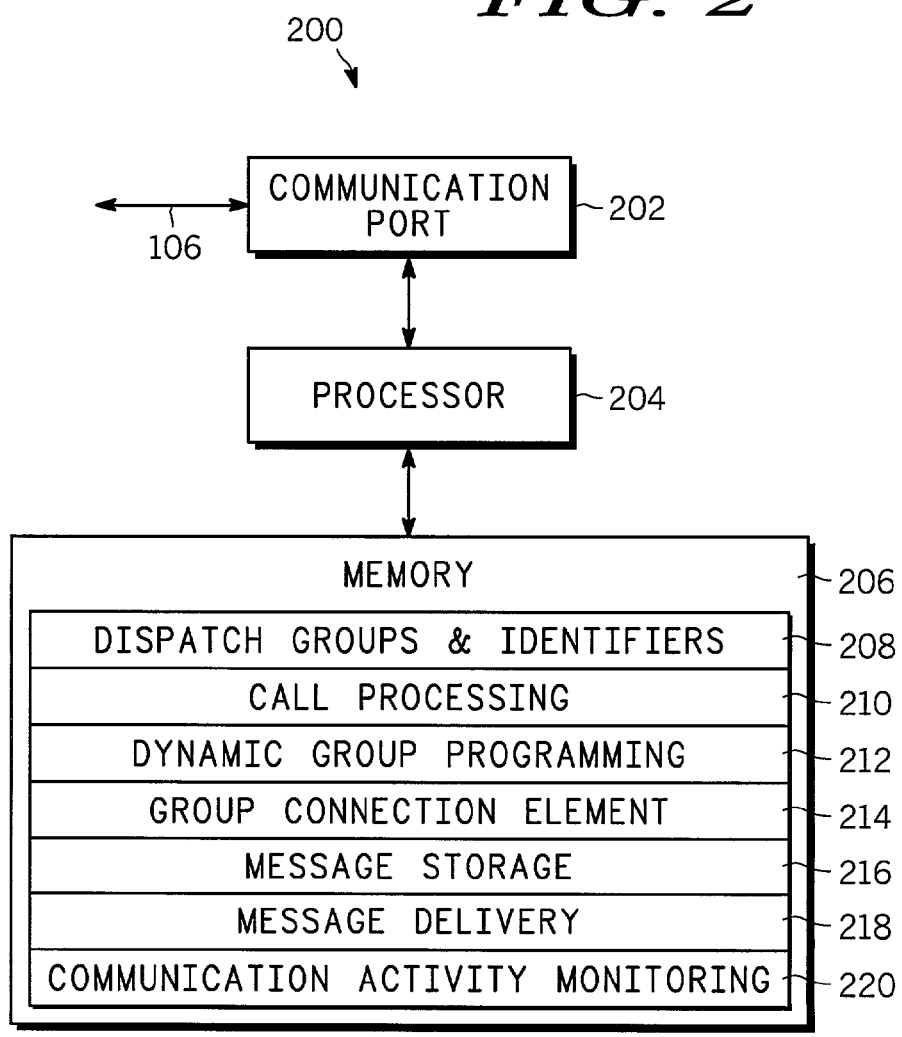
FIG. 2 is an electrical block diagram of an exemplary server of the dispatch system in accordance with a first embodiment of the present invention.

Referring to FIG. 2, an electrical block diagram of an exemplary server 200 of the dispatch system 100 in accordance with a first embodiment of the present invention comprises a conventional communication port 202 for conducting communications with the wireless communication system infrastructure 104 through the communication link 106, which, in this embodiment, is preferably a conventional wired communication link. The server 200 further comprises a processor 204 coupled to the communication port 202 for processing the communications. The server 200 preferably also includes a memory 206 coupled to the processor 204 for storing software and operating system parameters for programming the processor 204.

The memory 206 comprises a dispatch groups and identifiers element 208 for programming the processor 204 to define and store a dispatch group having a dispatch group identifier and including a plurality of wireless units. The dispatch group can, for example, be defined through telephone numbers assigned to the plurality of wireless units. The dispatch group identifier can, for example, take the form of a calling line identifier (CLI), or a range of CLIs, associated with the server 200. The memory 206 further comprises a call processing element 210 for programming the processor 204 to receive a call for the dispatch group, the call including a message. The call is preferably routed by the wireless communication system infrastructure 104 to the communication port 202 when the called telephone number belongs to a group of numbers pre-programmed into the infrastructure to be routed to the server through conventional techniques. In one embodiment, the memory 206 also includes a dynamic group programming element 212 for programming the processor 204 to allow a caller to dynamically program the plurality of wireless units into the memory 206 while the server receives the call for the dispatch group, through well-known remote-programming techniques.

The memory 206 further comprises a group connection element 214 for programming the processor 204 to establish, through the wireless communication system infrastructure 104, a group connection to the plurality of wireless units in response to receiving the call. The group connection can be established, for example, through a well-known technique similar to that for establishing a three-way calling connection in conventional wireless communication systems. For additional recipients, the three-way calling technique can be expanded, or a conventional conference bridge can be set up through the wireless communication system infrastructure 104. In one embodiment, the memory 206 includes a message storage element 216 for programming the processor 204 to store the message in the memory 206 before delivery. In addition, the memory 206 comprises a message delivery element 218 for programming the processor 204 to deliver the message and the dispatch group identifier to the plurality of wireless units through the group connection. The memory 206 also includes a communication activity monitoring element 220 for programming the processor 204 to end the group connection in response to a lack of communication activity through the group connection for longer than a predetermined time.

Figure 3:
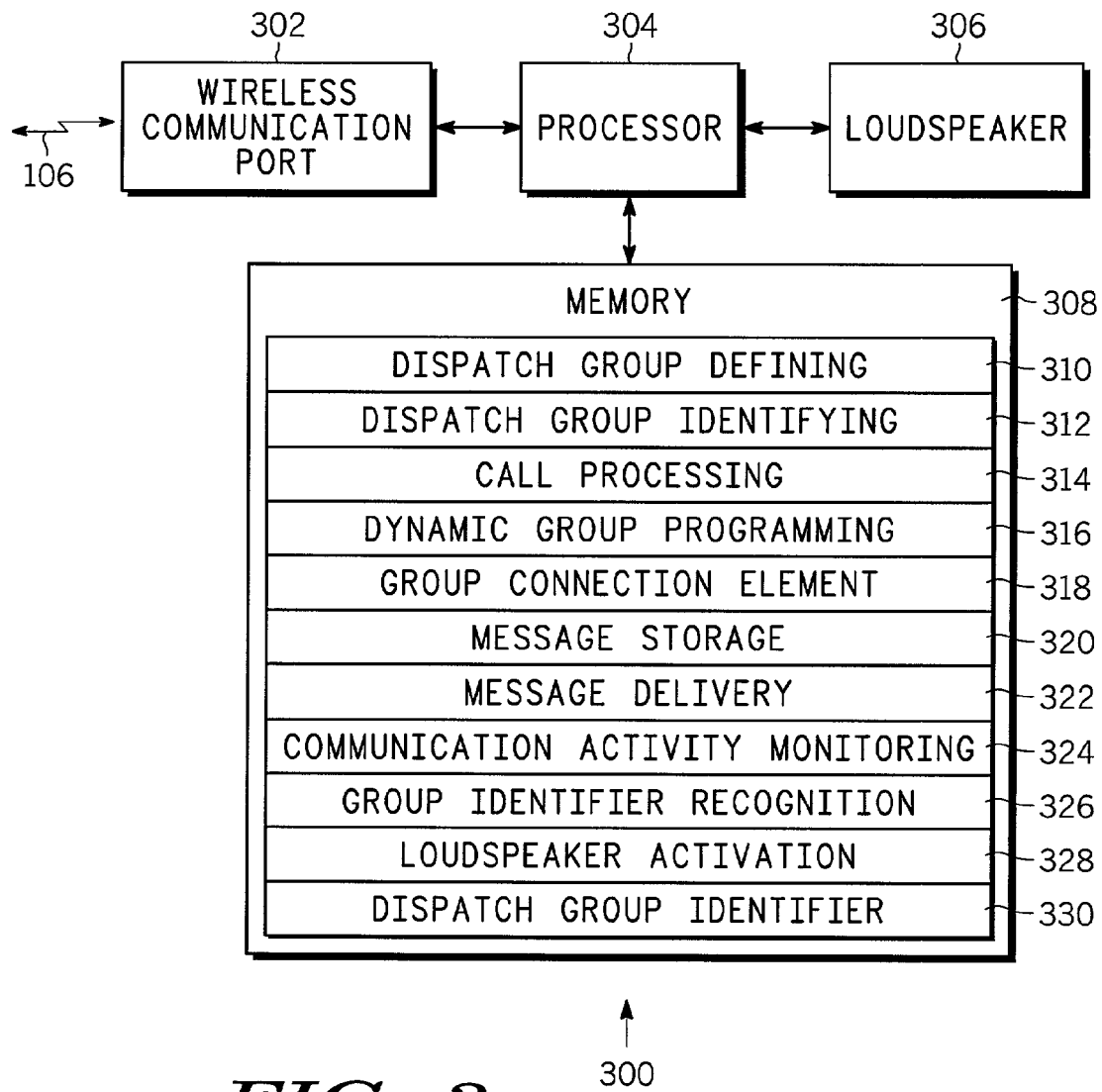
FIG. 3 is an electrical block diagram of an exemplary wireless mobile unit of the dispatch system in accordance with a second embodiment of the present invention.

Referring to FIG. 3, an electrical block diagram of an exemplary wireless mobile unit 300 of the dispatch system 100 in accordance with a second embodiment of the present invention comprises a conventional wireless communication port 302 for conducting communications with the wireless communication system infrastructure 104 through the communication link 106, which, in this embodiment, is preferably a wireless communication link created through a conventional wireless transceiver, such as a code-division multiple-access (CDMA) transceiver. The wireless mobile unit 300 further comprises a processor 304 coupled to the wireless communication port 302 for processing the communications. In addition, the wireless mobile unit 300 preferably includes a loudspeaker 306 coupled to the processor 304 for playing a received dispatch message. The wireless mobile unit 300 further comprises a memory 308 coupled to the processor 304 for storing software and operating system parameters for programming the processor 304.

The memory 308 comprises a dispatch group defining program segment 310 defining a dispatch group including a plurality of wireless units 300, and a dispatch group identifying program segment 312 identifying the dispatch group. The dispatch group can, for example, be identified by a calling line identifier (CLI) associated with the wireless mobile unit 300. The memory 308 further comprises a call processing element 314 for programming the processor 304 to receive a call for the dispatch group, the call including a message. The call is preferably originated in the wireless mobile unit 300 through well-known call origination techniques utilizing a conventional user interface (not shown) of the wireless mobile unit 300. In one embodiment, the memory 308 also includes a dynamic group programming element 316 for programming the processor 304 to allow a caller to dynamically program the plurality of wireless units 300 into the memory 308 while the caller originates the call for the dispatch group, through well-known keyboard entry techniques.

The memory 308 further comprises a group connection element 318 for programming the processor 304 to establish, through the wireless communication system infrastructure 104, a group connection to the plurality of wireless units 300 in response to receiving the call. The group connection can be established, for example, through a well-known technique similar to that for establishing a three-way calling connection in conventional wireless communication systems. For additional recipients, the three-way calling technique can be expanded, or a conventional conference bridge can be set up through the wireless communication system infrastructure 104. In one embodiment, the memory 308 includes a message storage element 320 for programming the processor 304 to store the message before delivery. In addition, the memory 308 comprises a message delivery element 322 for programming the processor 304 to deliver the message and the dispatch group identifier to the plurality of wireless units 300 through the group connection. The memory 308 also includes a communication activity monitoring element 324 for programming the processor 304 to end the group connection in response to a lack of communication activity through the group connection for longer than a predetermined time.

The memory 308 preferably also comprises a group identifier recognition element 326 for programming the processor 304 to recognize the dispatch group identifier when receiving a call from the wireless communication system infrastructure 104. The memory 308 further includes a loudspeaker activation element 328 for programming the processor 304 to play a received message through the loudspeaker 306 in response to recognizing a dispatch group identifier accompanying the message. It will be appreciated that, alternatively, the dispatch group identifier can be used to trigger additional features, such as storing the message in the receiving mobile unit, and playing different alert tones preceding the speaker audio. In addition, the memory 308 includes space for storing the dispatch group identifier 330 associated with a received call to allow the user to generate a response over the group connection, the response including the dispatch group identifier 330. It will be appreciated that, alternatively, for a wireless mobile unit 300 that is intended only to receive and respond to dispatch group calls, but not to set up and control dispatch group calls, the call origination and control elements 310–324 can be omitted and only the dispatch group participating elements 326–330 need be included in the memory 308.

Figure 4:
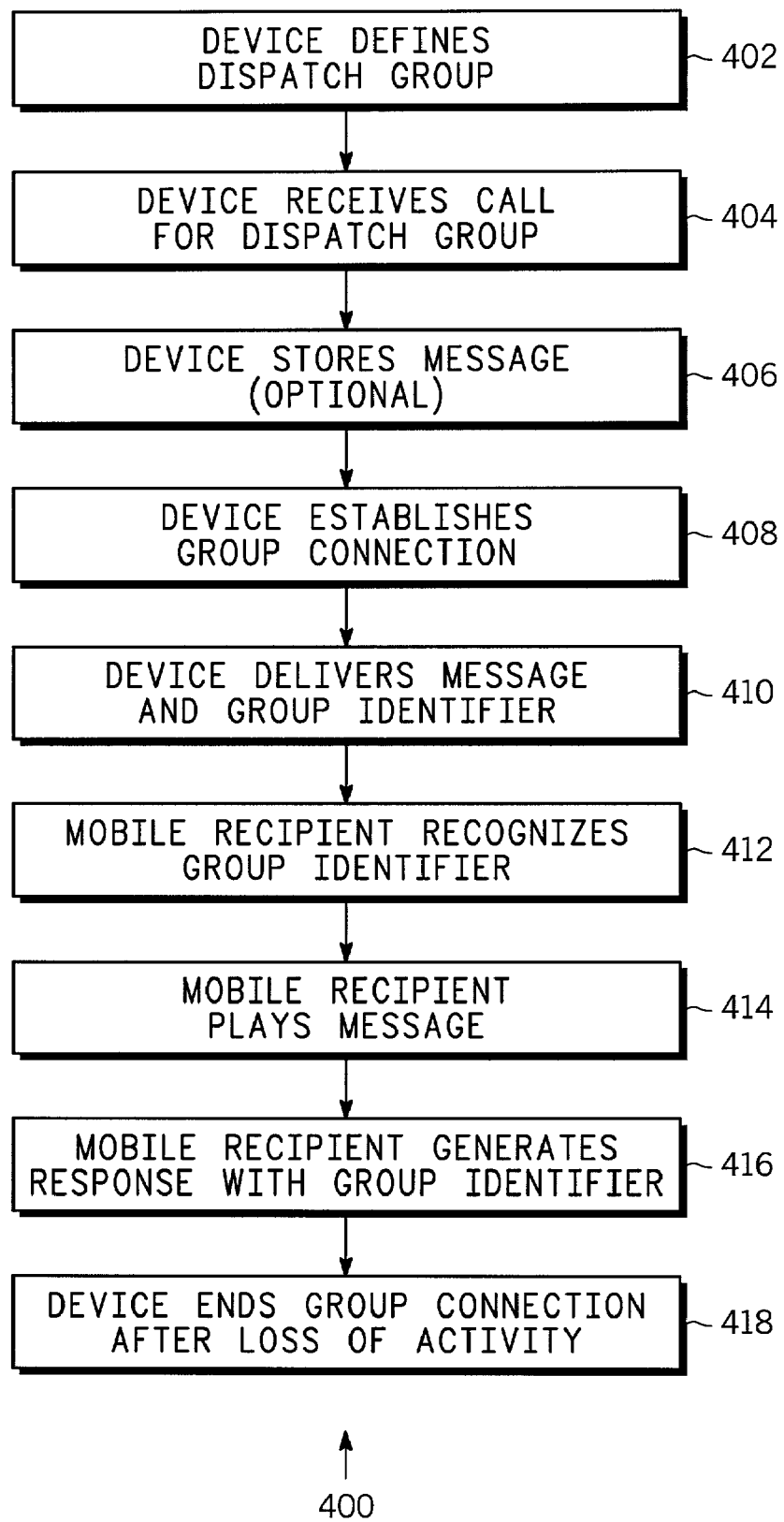
FIG. 4 is a flow diagram depicting operation of the dispatch system in accordance with the present invention.

Referring to FIG. 4, a flow diagram 400 depicting operation of the dispatch system in accordance with the present invention begins with defining 402, in the device 102 (e.g., the server 200 in the first embodiment, or the wireless mobile unit 300 in the second embodiment), a dispatch group having a dispatch group identifier and including a plurality of wireless units 300, identified, for example, by unique mobile telephone numbers. It will be appreciated that, in one embodiment, the dispatch group is defined by pre-programming the plurality of wireless units 300 in the device 102 prior to receiving the call for the dispatch group. It will be further appreciated that, in another embodiment, the dispatch group is defined by dynamically programming the plurality of wireless units 300 in the device 102 under caller control while receiving the call for the dispatch group, through well-known remote programming techniques.

Next, the device 102 receives 404 a call for the dispatch group, the call including a message. Optionally, the device 102 can also store 406 the message for later retrieval and delivery. Next, the device 102 establishes 408, through the wireless communication system infrastructure 104, a group connection to the plurality of wireless units 300 in response to receiving the call. The device 102 then delivers 410 the message and the dispatch group identifier 330 to the identified ones of the plurality of wireless units 300 through the group connection.

The identified ones of the plurality of wireless units 300 recognize 412 the dispatch group identifier 330; and play 414 the message through the loudspeaker 306, in response to the dispatch group identifier 330. One of the mobile recipients 300 can generate 416 a response over the group connection, the response comprising the dispatch group identifier 330. In response, other ones of the plurality of wireless units 300 will recognize the dispatch group identifier 330 and play the response message through their loudspeaker 306. The device 102 monitors communication activity on the group connection through well-known techniques, and ends 418 the group connection in response to a lack of communication activity for longer than a predetermined time.

Thus, it should be clear from the preceding disclosure that the present invention provides a method and apparatus for providing dispatch calling through a wireless communication system infrastructure. Advantageously, the method and apparatus adds dispatch calling capability without requiring a significant change to the existing wireless communication system infrastructure.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for providing dispatch calling through a wireless communication system infrastructure, the method comprising:
   defining, in a device external to the wireless communication system infrastructure, a dispatch group having a dispatch group identifier and including a plurality of wireless units;
   receiving, by said device, a call for the dispatch group, the call including a message, the message being stored;
   establishing, by said device, through the wireless communication system infrastructure, a group connection to the plurality of wireless units in response to receiving the call, the group connection corresponding to a multi-way calling connection to the plurality of wireless units; and
   delivering, by said device, the message and the dispatch group identifier to the plurality of wireless units through the group connection.

2. The method of claim 1, further comprising storing the message in said device, and delivering the message from storage after receiving and storing the message.

3. The method of claim 1, further comprising:
   recognizing the dispatch group identifier by one of the plurality of wireless units; and
   playing the message through a loudspeaker of the one of the plurality of wireless units in response to the dispatch group identifier.

4. The method of claim 1, further comprising:
   generating a response by one of the plurality of wireless units over the group connection, the response comprising the dispatch group identifier;
   recognizing the dispatch group identifier by another one of the plurality of wireless units; and
   playing the message through a loudspeaker of the another one of the plurality of wireless units in response to the dispatch group identifier.

5. The method of claim 1, further comprising
   ending, by said device, the group connection in response to a lack of communication activity through the group connection for longer than a predetermined time.

6. The method of claim 1, further comprising
   pre-programming the plurality of wireless units in said device prior to receiving the call for the dispatch group.

7. The method of claim 1, further comprising
   dynamically programming the plurality of wireless units in said device under caller control while receiving the call for the dispatch group.

8. A server for providing dispatch calling through a wireless communication system infrastructure, the server comprising:
   a communication port for conducting communications with the wireless communication system infrastructure;
   a processor coupled to the communication port for processing the communications; and
   a memory coupled to the processor for storing software and operating system parameters for programming the processor,
   wherein the processor is programmed to cooperate with the communication port and the memory to:
   define a dispatch group having a dispatch group identifier and including a plurality of wireless units;
   receive a call for the dispatch group, the call including a message and store the message;
   establish, through the wireless communication system infrastructure, a group connection to the plurality of wireless units in response to receiving the call, the group connection corresponding to a multi-way calling connection; and
   deliver the message and the dispatch group identifier to the plurality of wireless units through the group connection.

9. The server of claim 8, wherein the processor is further programmed to: store the message in the memory, and deliver the message front the memory after receiving and storing the message.

10. The server of claim 8, wherein the processor is further programmed to end the group connection in response to a lack of communication activity through the group connection for longer than a predetermined time.

11. The server of claim 8, wherein the processor is further programmed to pre-program the plurality of wireless units in the memory prior to receiving the call for the dispatch group.

12. The server of claim 8, wherein the processor is further programmed to allow a caller to dynamically program the plurality of wireless units in the memory while the server receives the call for the dispatch group.

13. A wireless mobile unit for providing dispatch calling through a wireless communication system infrastructure, the wireless mobile unit comprising:
   a wireless communication port for conducting communications with the wireless communication system infrastructure;
   a processor coupled to the wireless communication port for processing the communications; and
   a memory coupled to the processor for storing software and operating system parameters for programming the processor, the memory comprising:
   a dispatch group defining program segment defining a plurality of wireless units comprising a dispatch group; and
   a dispatch group identifying program segment identifying the dispatch group.

14. The wireless mobile unit of claim 13, wherein the processor is programmed to cooperate with the wireless communication port and the memory to:
receive a call for the dispatch group, the call including a message;
establish, through the wireless communication system infrastructure, a group connection to the plurality of wireless units in response to receiving the call, the group connection corresponding to a multi-way calling connection; and
deliver the message and the dispatch group identifier to the plurality of wireless units through the group connection.

15. The wireless mobile unit of claim 14, wherein the processor is further programmed to:
store the message in the memory, and
deliver the message from the memory after receiving and storing the message.

16. The wireless mobile unit of claim 14, further comprising a loudspeaker, and wherein the processor is further programmed to:
recognize the dispatch group identifier when receiving a call from the wireless communication system infrastructure; and
play the message through the loudspeaker in response to the dispatch group identifier.

17. The wireless mobile unit of claim 14, wherein the processor is further programmed to:
allow a user to generate a response over the group connection, the response comprising the dispatch group identifier.

18. The wireless mobile unit of claim 14, wherein the processor is further programmed to
end the group connection in response to a lack of communication activity through the group connection for longer than a predetermined time.

19. The wireless mobile unit of claim 14, wherein the processor is further programmed to
pre-program the plurality of wireless units in the memory prior to receiving the call for the dispatch group.

20. The wireless mobile unit of claim 14, wherein the processor is further programmed to
allow a caller to dynamically program the plurality of cellular units in the memory while or after receiving the call for the dispatch group.

21. A wireless mobile unit for providing dispatch calling through a wireless communication system infrastructure, the wireless mobile unit comprising:
a wireless communication port for conducting communications with the wireless communication system infrastructure;
a processor coupled to the wireless communication port for processing the communications; and
a memory coupled to the processor for storing software and operating system parameters for programming the processor, the memory comprising:
a dispatch group defining program segment defining a plurality of wireless units comprising a dispatch group; and
a dispatch group identifying program segment identifying the dispatch group;
wherein the processor is further programmed to cooperate with the wireless communication port to establish, through the wireless communication system infrastructure, a group connection to the plurality of wireless units in response to receiving a call, the group connection corresponding to a multi-way calling connection, the call including a message that is stored.

22. The wireless mobile unit of claim 21, wherein the processor is programmed to cooperate with the wireless communication port to:
receive the call for the dispatch group;
store the message in the memory; and
retrieve the message from the memory and deliver the message and the dispatch group identifier to the plurality of wireless units through the group connection.

23. The wireless mobile unit of claim 21, further comprising a loudspeaker, and wherein the processor is further programmed to:
recognize the dispatch group identifier when receiving a call from the wireless communication system infrastructure; and
play the message through the loudspeaker in response to the dispatch group identifier.

* * * * *

UNITED STATES PATENT AND TRADEMARK OFFICE
CERTIFICATE OF CORRECTION

PATENT NO. : 6,965,779 B2  
DATED : November 15, 2005  
INVENTOR(S) : Hill et al.

It is certified that error appears in the above-identified patent and that said Letters Patent is hereby corrected as shown below:

Column 6,
Line 38, delete "front" and insert -- from --.

Signed and Sealed this

Twenty-first Day of February, 2006

JON W. DUDAS
*Director of the United States Patent and Trademark Office*